United States Patent
Sugiura

(10) Patent No.: US 7,403,831 B2
(45) Date of Patent: Jul. 22, 2008

(54) MANUFACTURING APPARATUS, PROCESSING METHOD AND DEVICE MANUFACTURING METHOD

(75) Inventor: Satoshi Sugiura, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/442,936

(22) Filed: May 30, 2006

(65) Prior Publication Data
US 2006/0271221 A1 Nov. 30, 2006

(30) Foreign Application Priority Data
May 31, 2005 (JP) ............................. 2005-159937

(51) Int. Cl.
*G06F 19/00* (2006.01)
(52) U.S. Cl. .......................... 700/100; 700/97; 700/121
(58) Field of Classification Search .................. 700/90, 700/95, 97, 99–101, 117, 121
See application file for complete search history.

(56) References Cited

U.S. PATENT DOCUMENTS

| | | | | |
|---|---|---|---|---|
| 5,586,021 A | * | 12/1996 | Fargher et al. | 700/100 |
| 5,596,502 A | * | 1/1997 | Koski et al. | 700/95 |
| 6,216,051 B1 | * | 4/2001 | Hager et al. | 700/82 |
| 7,043,322 B1 | * | 5/2006 | Denton et al. | 700/100 |
| 7,216,222 B2 | * | 5/2007 | Holzmann | 713/1 |
| 2002/0159567 A1 | * | 10/2002 | Sako et al. | 378/117 |
| 2005/0097288 A1 | * | 5/2005 | Holzmann | 711/162 |
| 2005/0172093 A1 | * | 8/2005 | Jain | 711/162 |

FOREIGN PATENT DOCUMENTS

JP 2002-217098 8/2002

* cited by examiner

*Primary Examiner*—Alexander J Kosowski
(74) *Attorney, Agent, or Firm*—Cowan, Liebowitz & Latman, P.C.

(57) ABSTRACT

A semiconductor manufacturing apparatus which processes a lot in accordance with the content of a queue table in which a process of a lot is reserved includes a volatile memory configured to store the queue table, and a controller configured to store, in a nonvolatile memory, the content of the queue table stored in the volatile memory.

7 Claims, 6 Drawing Sheets

MANUFACTURING APPARATUS, PROCESSING METHOD AND DEVICE MANUFACTURING METHOD

FIELD OF THE INVENTION

The present invention relates to a manufacturing apparatus, a processing method and a device manufacturing method.

BACKGROUND OF THE INVENTION

Because of a reduction in the production quality and an increase in the number of types of semiconductors, a new tendency in semiconductor manufacturing apparatus is emerging, more particularly, in semiconductor exposure apparatuses which handle a reduced number of wafers per lot and a lot count increase. Under such condition, semiconductor manufacturing apparatuses need to efficiently switch between lots at high speed. For example, Japanese Patent Laid-Open No. 2002-217098 (FIG. 4, paragraph No. 0031) allows a semiconductor manufacturing apparatus to reserve lots to be processed, using a queue table to register the lot processing conditions and lot processing order.

Unfortunately, in Japanese Patent Laid-Open No. 2002-217098, the contents of the queue table are lost when, e.g., the semiconductor manufacturing apparatus is reactivated while lot information is registered in the queue table. Therefore, if the semiconductor manufacturing apparatus must be reactivated due to an unexpected accident, lot information needs to be re-registered in the queue table to continue the lot process. As a result, the production efficiency of the semiconductor manufacturing apparatus diminishes.

SUMMARY OF THE INVENTION

The present invention has been made in consideration of the above background, and has as its exemplary object to make it possible to restore the contents of a queue table.

The first aspect of the present invention relates to a manufacturing apparatus which processes a lot in accordance with a content of a queue table in which a process of a lot is reserved, the apparatus comprising a volatile memory configured to store the queue table, and a controller configured to store, in a nonvolatile memory, the content of the queue table stored in the volatile memory.

The second aspect of the present invention relates to a processing method of processing a lot in accordance with a content of a queue table in which a process of a lot is reserved, the method comprising steps of storing reservation information of a process of a lot in the queue table in a volatile memory, and storing, in a nonvolatile memory, the content of the queue table stored in the volatile memory.

The third aspect of the present invention relates to a method of manufacturing a device, wherein the method comprising steps of exposing a substrate to a pattern the above manufacturing apparatus, developing the exposed substrate, and processing the developed substrate to manufacture the device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

[Semiconductor Manufacturing Apparatus]

Figure 1:
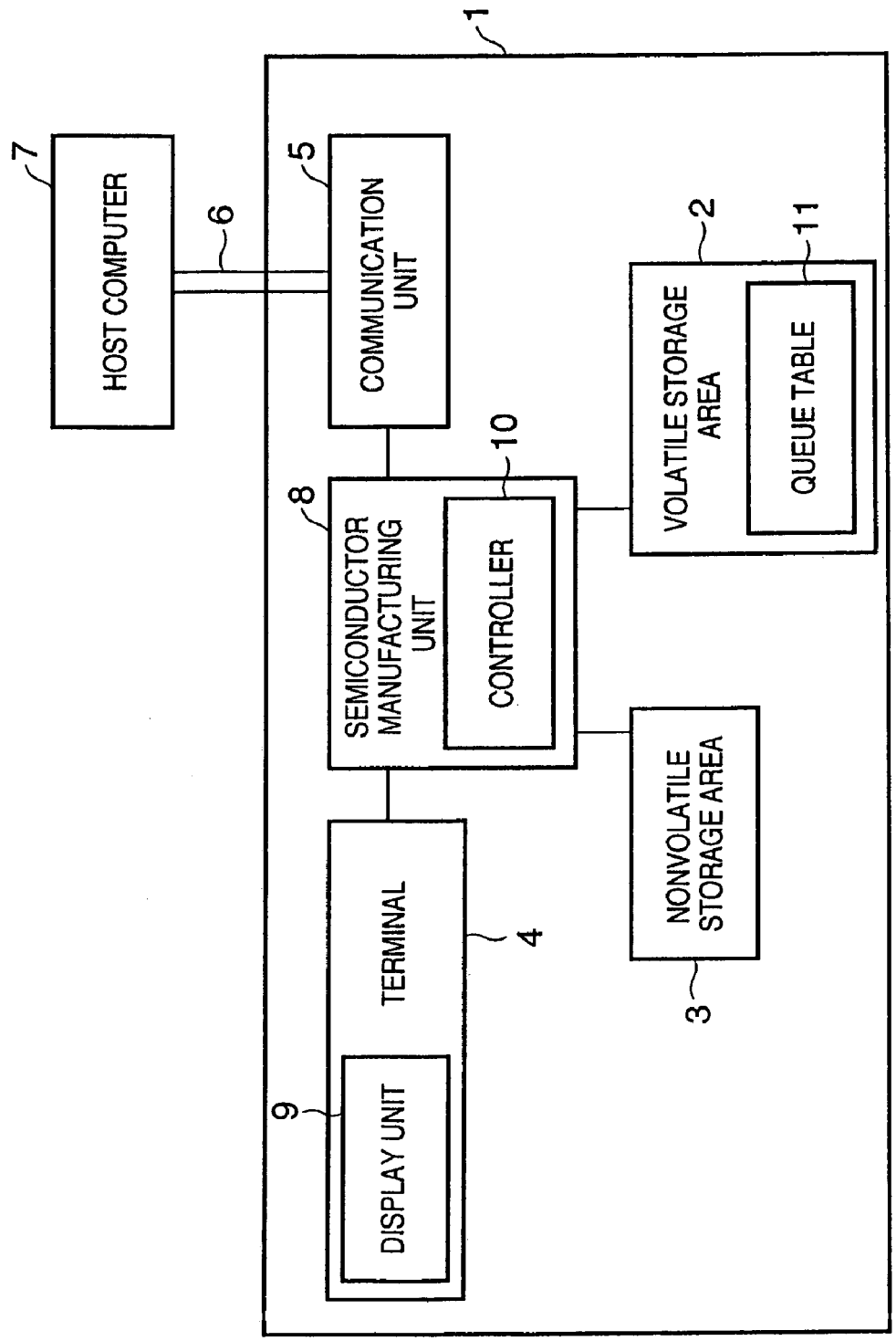
FIG. 1 is a block diagram showing a semiconductor manufacturing apparatus according to a preferred embodiment of the present invention.

FIG. 1 is a block diagram showing the schematic arrangement of a semiconductor manufacturing apparatus 1 according to a preferred embodiment of the present invention.

As shown in FIG. 1, the semiconductor manufacturing apparatus 1 according to the preferred embodiment of the present invention comprises, e.g., a volatile storage area 2, nonvolatile storage area 3, terminal unit 4, communication unit 5, and semiconductor manufacturing unit 8. The volatile or nonvolatile storage area can be appropriately selected from various kinds of volatile or nonvolatile storage devices or storage units.

The volatile storage area 2 is used to rewrite, hold, and read out various kinds of stored information used in the semiconductor manufacturing apparatus 1. The information stored in the volatile storage area 2 is lost upon shutting down the power supply. A queue table 11 which registers information (e.g., the processing conditions and processing order of a plurality of lots) of lots to be processed is normally stored in the volatile storage area 2.

The nonvolatile storage area 3 is used to save the contents of the queue table 11 stored in the volatile storage area 2, and read out the stored contents of the queue table 11 at the time of reactivating the semiconductor manufacturing apparatus 1. Although the nonvolatile storage area 3 is arranged inside the semiconductor manufacturing apparatus 1 in FIG. 1, the present invention is not limited to this. A nonvolatile storage area arranged outside the semiconductor manufacturing apparatus 1 and connected to be communicable with the semiconductor manufacturing apparatus 1 may be used.

The terminal unit 4 has a user interface attached to the semiconductor manufacturing apparatus 1. The operator can operate the units in the semiconductor manufacturing apparatus 1 via the terminal unit 4 and refer to the device information in the semiconductor manufacturing apparatus 1. The terminal unit 4 inputs, to a controller 10, an instruction to restore, in the volatile storage area 2, the contents of the queue table 11 stored in the nonvolatile storage area 3. The terminal unit 4 also comprises a display unit 9 to display the contents of the queue table 11 stored in the nonvolatile storage area 3. The operator can confirm, via the display unit 9, the contents of the queue table 11 stored in the nonvolatile storage area 3.

The communication unit 5 connects the semiconductor manufacturing apparatus 1 and a host computer 7 via a communication line 6 compatible to a standard such as RS-232C. This makes it possible to control the semiconductor manufacturing apparatus 1 even from the host computer 7. The communication unit 5 notifies the host computer 7 of the contents of the queue table 11 stored in the nonvolatile storage area 3.

The semiconductor manufacturing unit 8 may be an apparatus including a semiconductor processing device to execute a semiconductor exposure process, semiconductor cleaning process, and various other semiconductor processes (various processes associated with the wafer process to be described later).

The controller 10 controls the overall operation of the semiconductor manufacturing apparatus 1 to execute a lot process in accordance with the contents of the queue table 11 stored in the volatile storage area 2. The controller 10 causes, in accordance with an instruction from the terminal unit 4, the display unit 9 of the terminal unit 4 to display the contents of the queue table 11 saved in the nonvolatile storage area 3, at the time of activating the semiconductor manufacturing apparatus 1.

Figure 2:
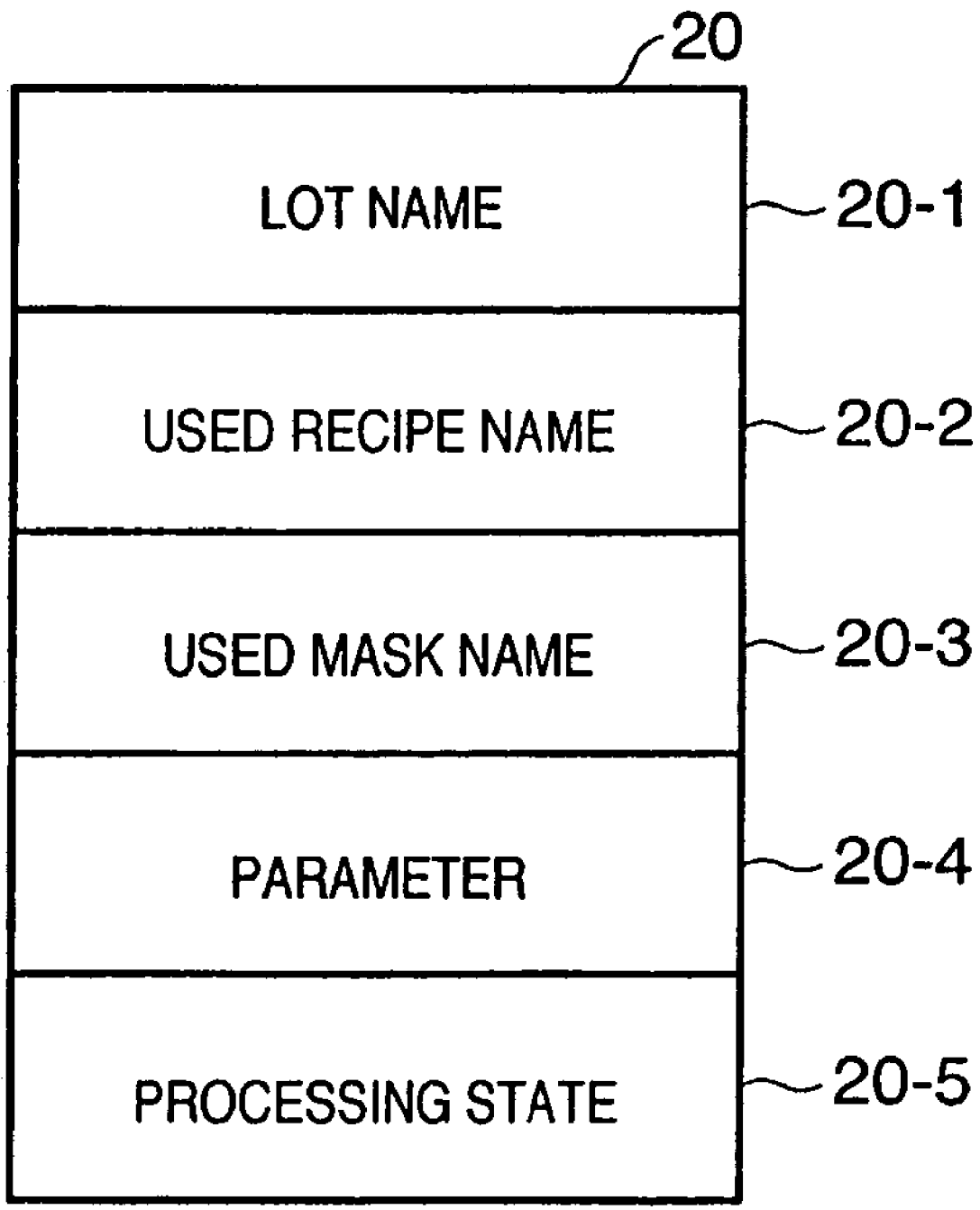
FIG. 2 is a view showing an example of the contents of pieces of lot information according to the preferred embodiment of the present invention.

FIG. 2 is a view showing an example of pieces of lot information 20 registered in the queue table 11. Reference numeral 20-1 denotes the name of a lot as a processing unit. Reference numeral 20-2 denotes the name of a recipe used in the process. Reference numeral 20-3 denotes the name of a mask used in, e.g., a semiconductor exposure apparatus. Reference numeral 20-4 denotes a parameter unique to the controller 10 to control the overall process of the semiconductor manufacturing apparatus 1. Reference numeral 20-5 denotes the current lot processing state. The contents of the pieces of lot information 20-1 to 20-5 registered in the queue table 11 can be rewritten by the controller 10.

Figure 3:
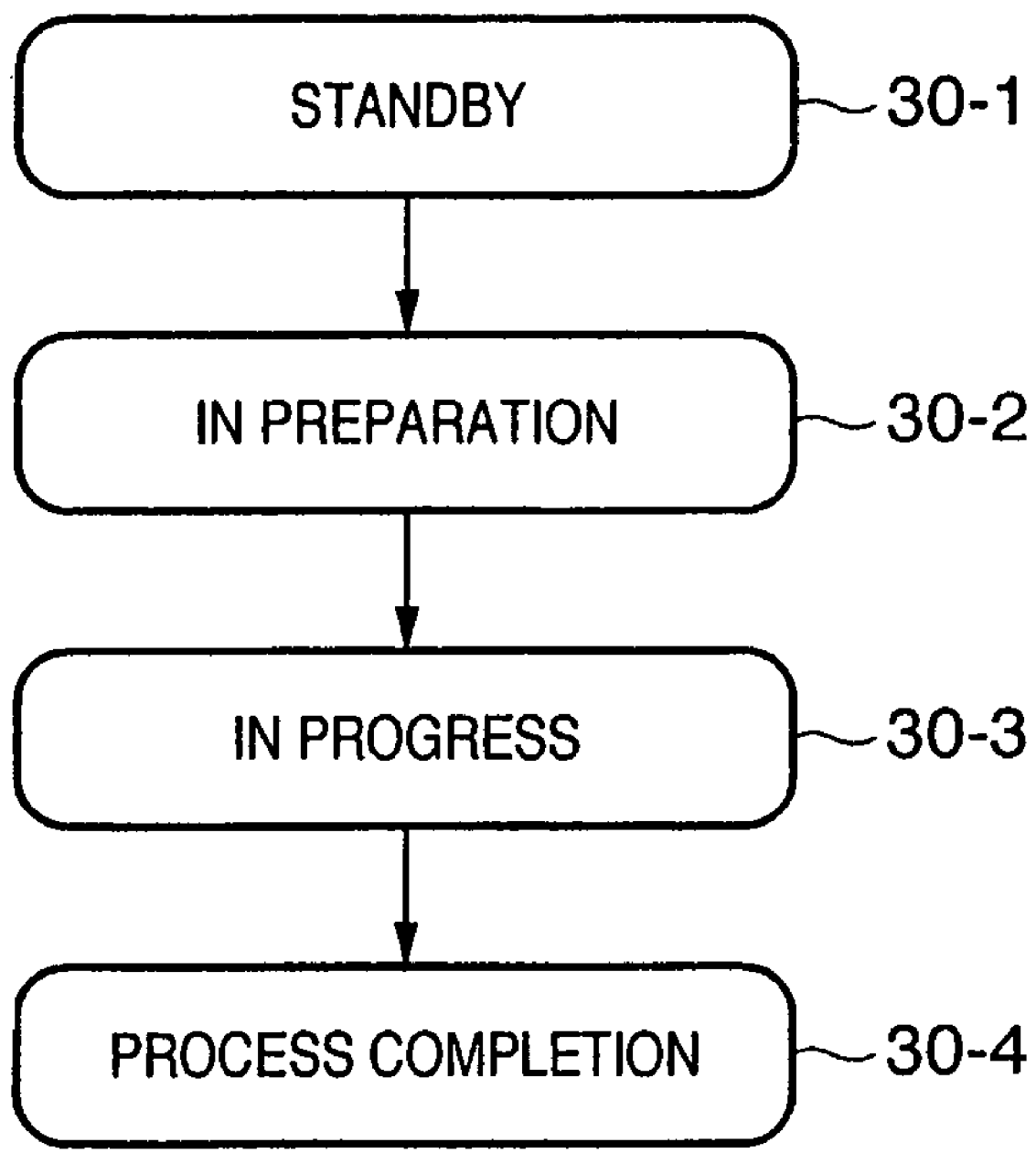
FIG. 3 is a view showing an example of lot state transition according to the preferred embodiment of the present invention.

FIG. 3 is a view showing a concrete example of the processing state 20-5 in FIG. 2. The processing state changes in the order of 30-1, 30-2, 30-3, and 30-4 as shown in FIG. 3. The processing state 20-5 in FIG. 2 registers the current processing state out of 30-1 to 30-4. Reference numeral 30-1 denotes a standby state in which the lot information 20 is merely registered in the queue table 11. Reference numeral 30-2 denotes an in-preparation state in which a wafer to be used in a lot is being transported. Reference numeral 30-3 denotes an in-progress state in which the wafer is being processed. Reference numeral 30-4 denotes a process completion state in which processing of the entire wafer in the lot is complete.

Figure 4:
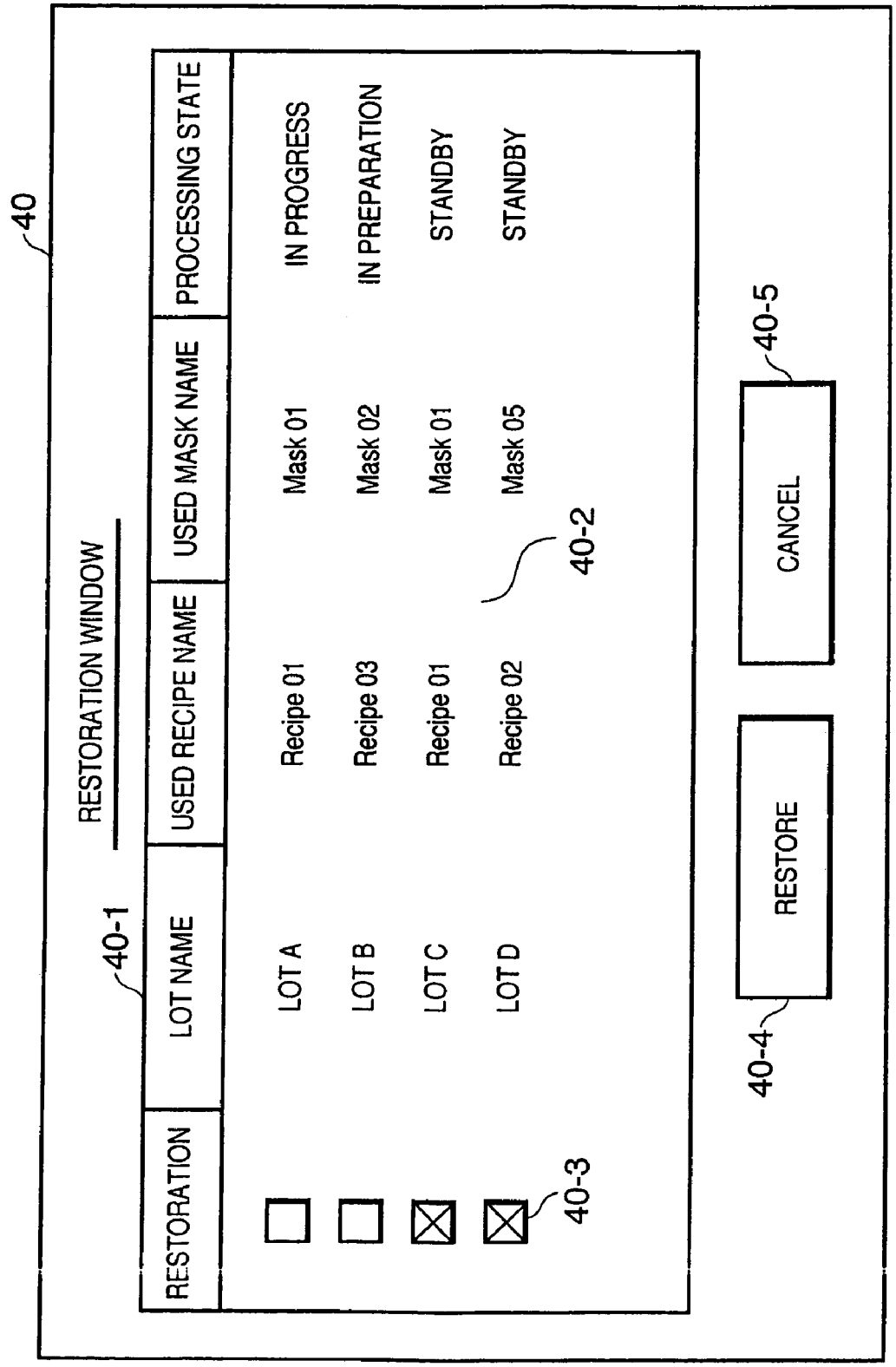
FIG. 4 is a view showing an example of a queue table restoration window according to the preferred embodiment of the present invention.

FIG. 4 is a view showing an example of a restoration window 40 when the contents of the queue table 11 saved in the nonvolatile storage area 3 are restored on the display unit 9 of the terminal unit 4. The restoration window 40 is used in restoring, as the current queue table 11, the contents of the queue table 11 saved in the nonvolatile storage area 3. A window region 40-1 displays the saved contents contained in the queue table 11. Saved contents 40-2 are contained in the queue table 11. The contents 40-2 may comprise one or a plurality of pieces of lot information 20 (see FIG. 2). As an example, the pieces of lot information 20 associated with four lots, i.e., LOT-A, LOT-B, LOT-C, and LOT-D are shown in FIG. 4. LOT-A exhibits "Recipe01" as the used recipe name 20-2, "Mask01" as the used mask name 20-3, and "in-progress" as the processing state 20-5. LOT-B exhibits "Recipe03" as the used recipe name 20-2, "Mask02" as the used mask name 20-3, and "in-preparation" as the processing state 20-5. LOT-C exhibits "Recipe01" as the used recipe name 20-2, "Mask01" as the used mask name 20-3, and "standby state" as the processing state 20-5. LOT-D exhibits "Recipe02" as the used recipe name 20-2, "Mask05" as the used mask name 20-3, and "standby state" as the processing state 20-5.

Check boxes 40-3 allow the operator to select pieces of lot information 20 as restoration targets in restoring the contents of the queue table 11. A button 40-4 allows the operator to restore the contents of the queue table 11. When the operator presses the button 40-4 using the terminal unit 4, lot information 20 selected through the check boxes 40-3 is restored on the current queue table 11. After the queue table 11 is restored, the window 40 is closed. Reference numeral 40-5 denotes a cancel button. When the operator presses the button 40-5 using the terminal unit 4, the window 40 is closed without restoring the contents of the queue table 11.

In the manufacture using a semiconductor manufacturing apparatus, the operator or host computer 7 registers lot information 20 as processing targets. Then, the controller 10 of the semiconductor manufacturing apparatus 1 monitors the contents of the queue table 11, and executes a lot process in turn using the registered pieces of lot information 20. The controller 10 of the semiconductor manufacturing apparatus 1 writes the current processing states 30 of the lots in the pieces of lot information 20 registered in the queue table 11.

Every time the contents of the queue table 11 change, the controller 10 of the semiconductor manufacturing apparatus 1 saves them in the nonvolatile storage area 3. If the queue table 11 becomes empty, the controller 10 of the semiconductor manufacturing apparatus 1 erases the contents saved in the nonvolatile storage area 3.

During the manufacture by the semiconductor manufacturing apparatus, the semiconductor manufacturing apparatus 1 sometimes needs to be reactivated while lot information 20 is registered in the queue table 11. In this case, the controller 10 of the semiconductor manufacturing apparatus 1 erases the contents of the queue table 11 once at the time of activation. However, the controller 10 of the semiconductor manufacturing apparatus 1 does not change the information saved in the nonvolatile storage area 3. Therefore, after activating the semiconductor manufacturing apparatus 1 is completed, the controller 10 of the semiconductor manufacturing apparatus 1 displays the window 40 on the terminal unit 4. This makes it possible to cause the controller 10 of the semiconductor manufacturing apparatus 1 to present the contents of the queue table 11 saved in the nonvolatile storage area 3 to the operator. The contents of the queue table 11 presented here are identical to those immediately before reactivating the semiconductor manufacturing apparatus 1.

The operator having confirmed the contents of the window 40 presses the restoration button 40-4 after checking the check box 40-3 of the lot information to be restored. With this operation, the selected lot information 20 is restored on the queue table 11 and the semiconductor manufacturing apparatus 1 continues the lot process. If the operator does not want to restore lot information 20, he/she presses the cancel button 40-5 on the window 40. Accordingly, the queue table 11 is kept empty. The semiconductor manufacturing apparatus 1 is held in a standby state until new lot information 20 is registered.

The above embodiment has exemplified a case wherein the operator restores the contents of the queue table 11. However, the restoration operation may be executed by the host computer 7. In this case, the contents of the queue table 11 saved in the nonvolatile storage area 3 are sent to the host computer 7 by the communication unit 5 via the communication line 6 after activation of the semiconductor manufacturing apparatus 1 is completed. Upon receiving the notification, the host computer 7 instructs the semiconductor manufacturing apparatus 1 which lot information is to be restored.

[Semiconductor Manufacturing Apparatus Control Method]

The flow of a semiconductor manufacturing apparatus control method according to a preferred embodiment of the present invention will be described below. First, a controller 10 stores, in a volatile storage area 2, a queue table 11 to reserve the processing conditions and processing order of a plurality of lots. Next, the controller 10 stores, in a nonvolatile storage area 3, the contents of the queue table 11 stored in the volatile storage area 2. This makes it possible to cause, in accordance with an instruction from a terminal unit 4, the controller 10 to restore, on a display unit 9 of the terminal unit 4, the contents of the queue table saved in the nonvolatile storage area 3, at the time of activating a semiconductor manufacturing apparatus 1.

Figure 5:
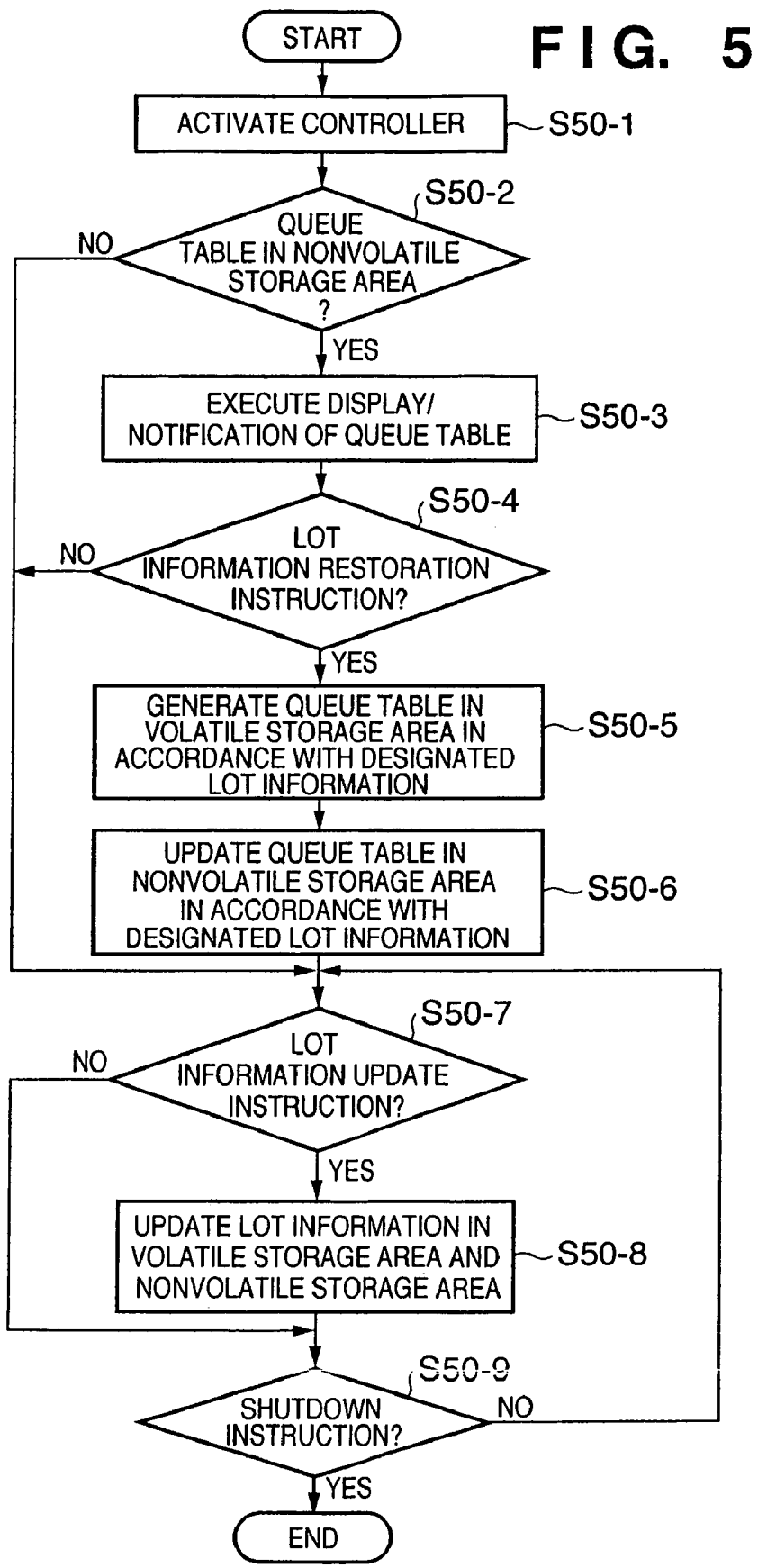
FIG. 5 is a flowchart showing a semiconductor manufacturing apparatus control method according to a preferred embodiment of the present invention.

FIG. 5 is a flowchart showing a more detailed flow of control to restore the contents of a queue table saved in a nonvolatile storage area.

In step S50-1, the controller 10 of the semiconductor manufacturing apparatus 1 is activated.

In step S50-2, the controller 10 determines whether the queue table 11 is stored in the nonvolatile storage area 3. If the queue table 11 is stored in the nonvolatile storage area 3 ("YES" in step S50-2), the flow advances to step S50-3. If the queue table 11 is not stored in the nonvolatile storage area 3 ("NO" in step S50-2), the flow advances to step S50-7.

In step S50-3, the controller 10 causes the display unit 9 of the terminal unit 4 to display the contents of the queue table 11 stored in the nonvolatile storage area 3. Alternatively, the controller 10 causes a communication unit 5 to notify a host computer 7 of the contents of the queue table 11 stored in the nonvolatile storage area 3.

In step S50-4, the controller 10 determines whether the terminal unit 4 or host computer 7 has issued an instruction to restore, in the volatile storage area 2, lot information in the queue table 11 stored in the nonvolatile storage area 3. If the restoration instruction has been issued ("YES" in step S50-4), the flow advances to step S50-5. If no restoration instruction is issued ("NO" in step S50-4), the flow advances to step S50-7.

In step S50-5, the controller 10 generates the queue table 11 in the volatile storage area 2 in accordance with the lot information in the queue table 11, which is designated in step S50-4.

In step S50-6, the controller 10 updates the queue table 11 in the nonvolatile storage area 3 in accordance with the lot information in the queue table 11, which is designated in step S50-4. Lot information in the queue table 11, which is not designated in step S50-4, can be erased from the nonvolatile storage area 3.

In step S50-7, the controller 10 determines whether the terminal unit 4 or host computer 7 has issued an instruction to update lot information in the queue table 11. If the update instruction has been issued ("YES" in step S50-7), the flow advances to step S50-8. If no update instruction is issued ("NO" in step S50-7), the flow advances to step S50-9.

In step S50-8, the controller 10 updates the lot information in the volatile storage area 2 and nonvolatile storage area 3 in accordance with the update instruction in step S50-7.

In step S50-9, the controller 10 determines whether the terminal unit 4 or host computer 7 has issued an instruction to shut down the semiconductor manufacturing apparatus 1. If the shutdown instruction has been issued ("YES" in step S50-9), the process is terminated. If no shutdown instruction is issued ("NO" in step S50-9), the flow returns to step S50-7.

[Semiconductor Device Manufacturing Process]

Figure 6:
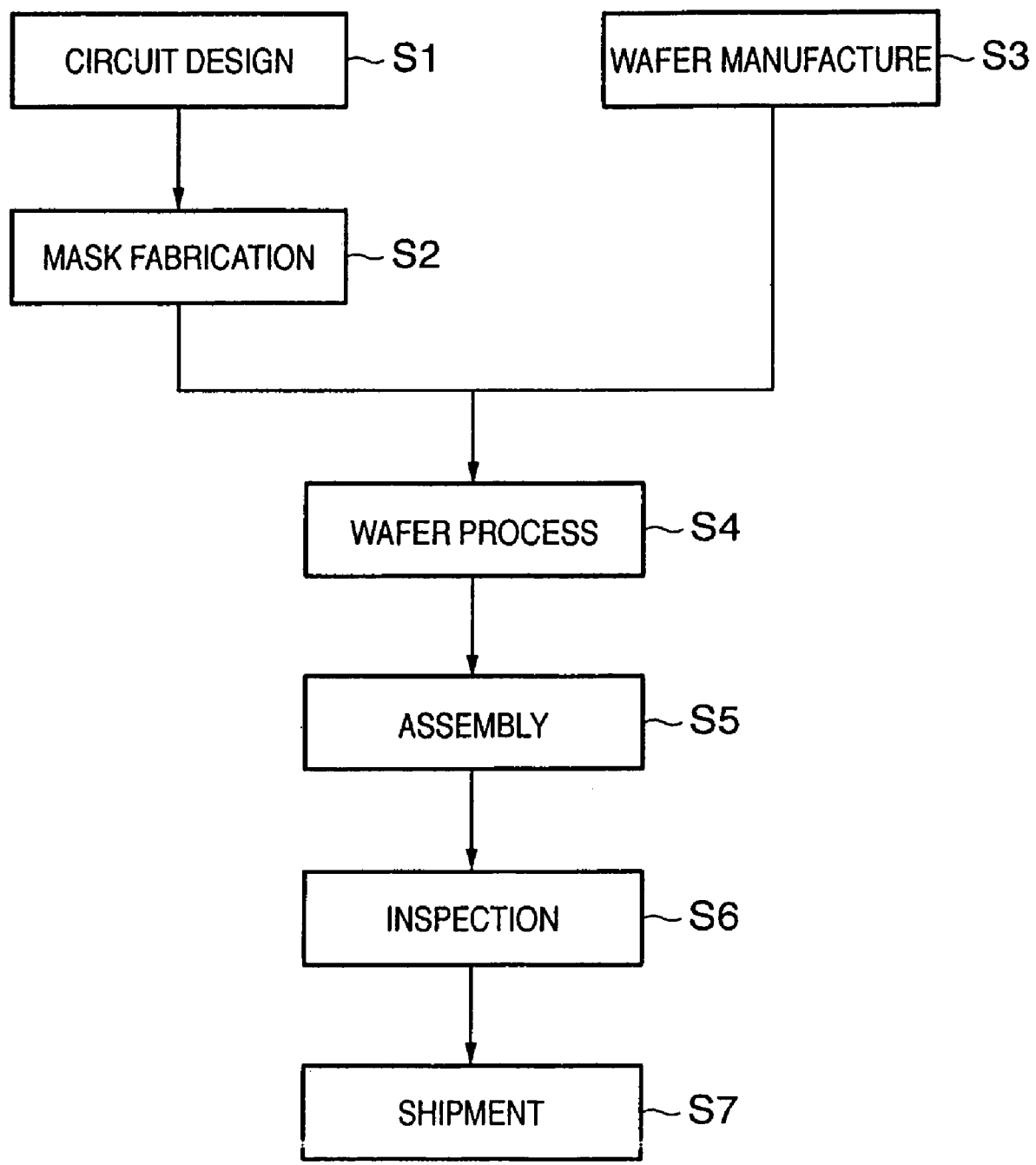
FIG. 6 is a flowchart showing the flow of the overall semiconductor device manufacturing process.

A semiconductor device manufacturing process when the semiconductor manufacturing apparatus is used as a semiconductor exposure apparatus will be described next. FIG. 6 is a flowchart showing the flow of the overall semiconductor device manufacturing process. In step S1 (circuit design), the circuit of a semiconductor device is designed. In step S2 (mask fabrication), a mask (also called an original or reticle) is fabricated on the basis of the designed circuit pattern. In step S3 (wafer manufacture), a wafer (also called a substrate) is manufactured using a material such as silicon. In step S4 (wafer process) called a pre-process, a semiconductor manufacturing apparatus according to a preferred embodiment of the present invention is caused to form an actual circuit on the wafer by lithography using the mask and wafer. In step S5 (assembly) called a post-process, a semiconductor chip is formed using the wafer manufactured in step S4. This step includes an assembly step (dicing and bonding) and packaging step (chip encapsulation). In step S6 (inspection), the semiconductor device manufactured in step S5 undergoes inspections such as an operation confirmation test and durability test. After these steps, the semiconductor device is completed and shipped in step S7.

The wafer process in step S4 includes: an oxidation step of oxidizing the wafer surface; a CVD step of forming an insulating film on the wafer surface; an electrode formation step of forming an electrode on the wafer by vapor deposition; an ion implantation step of implanting ions in the wafer; a resist processing step of applying a photosensitive agent to the wafer; an exposure step of exposing, using the above-described exposure apparatus, the wafer, which has been subjected to the resist processing step, to light via the mask on which the circuit pattern is formed or to a pattern to form a latent image pattern on the resist; a development step of developing the latent image pattern on the wafer exposed in the exposure step; an etching step of etching portions other than the latent image pattern developed in the development step; and a resist removal step of removing any unnecessary resist remaining after etching. These steps are repeated to form multiple circuit patterns on the wafer.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2005-159937 filed on May 31, 2005, which is hereby incorporated by reference herein.

What is claimed is:

1. A manufacturing apparatus which processes a lot in accordance with a content of a queue table in which information of a lot to be processed is reserved, said apparatus comprising:

a volatile memory configured to store the queue table;

a nonvolatile memory;

a controller configured to store, in said nonvolatile memory, a content of the queue table stored in said volatile memory; and a display, wherein said controller is configured to (i) upon activation thereof, if a queue table is stored in said nonvolatile memory, cause said display to display a content of the queue table, (ii) if a first instruction to restore, in said volatile memory, information in the queue table displayed by said display is issued, generate a queue table in said volatile memory in accordance with the first instruction, and update the queue table in said nonvolatile memory in accordance with the first instruction, and (iii) if a second instruction to update information in the queue table is issued, update the queue table in said volatile memory and the queue table in said nonvolatile memory in accordance with the second instruction.

2. An apparatus according to claim 1, further comprising a user interface configured to issuer the first instruction to said controller.

3. An apparatus according to claim 1, wherein said apparatus is an exposure apparatus for exposing a substrate to a pattern.

4. A method of manufacturing a device, said method comprising steps of:

exposing a substrate to a pattern using an exposure apparatus;

developing the exposed substrate; and processing the developed substrate to manufacture the device, wherein the exposure apparatus processes a lot of the substrate in accordance with a content of a queue table in which information of a lot of the substrate to be processed is reserved, the apparatus comprising:

a volatile memory configured to store the queue table;

a nonvolatile memory;

a controller configured to store, in the nonvolatile memory, a content of the queue table stored in the volatile memory; and a display, wherein the controller is configured to (i) upon activation thereof, if a queue table is stored in the nonvolatile memory, cause the display to display a content of the queue table, (ii) if a first instruction to restore, in the volatile memory, information in the queue table displayed by the display is issued, generate a queue table in the volatile memory in accordance with the first instruction, and update the queue table in the nonvolatile memory in accordance with the first instruction, and (iii) if a second instruction to update information in the queue table is issued, update the queue table in the volatile memory and the queue table in the nonvolatile memory in accordance with the second instruction.

5. A manufacturing apparatus which processes a lot in accordance with a content of a queue table in which information of a lot to be processed is reserved, said apparatus comprising:

a volatile memory configured to store the queue table;

a nonvolatile memory;

a controller configured to store, in said nonvolatile memory, a content of the queue table stored in said volatile memory; and a communication unit, wherein said controller is configured to (i) upon activation thereof, if a queue table is stored in said nonvolatile memory, cause said communication unit to transmit a content of the queue table to a host computer, (ii) if a first instruction to restore, in said volatile memory, information in the queue table is issued from the host computer, generate a queue table in said volatile memory in accordance with the first instruction, and update the queue table in said nonvolatile memory in accordance with the first instruction, and (iii) if a second instruction to update information in the queue table is issued, update the queue table in said volatile memory and the queue table in said nonvolatile memory in accordance with the second instruction.

6. An apparatus according to claim 5, wherein said apparatus is an exposure apparatus for exposing a substrate to a pattern.

7. A method of manufacturing a device, said method comprising steps of:

exposing a substrate to a pattern using an exposure apparatus;

developing the exposed substrate; and processing the developed substrate to manufacture the device, wherein the exposure apparatus processes a lot of the substrate in accordance with a content of a queue table in which information of a lot of the substrate to be processed is reserved, the apparatus comprising:

a volatile memory configured to store the queue table;

a nonvolatile memory;

a controller configured to store, in the nonvolatile memory, a content of the queue table stored in the volatile memory; and a communication unit, wherein the controller is configured to (i) upon activation thereof, if a queue table is stored in the nonvolatile memory, cause the communication unit to transmit a content of the queue table to a host computer, (ii) if a first instruction to restore, in the volatile memory, information in the queue table is issued from the host computer, generate a queue table in the volatile memory in accordance with the first instruction, and update the queue table in the nonvolatile memory in accordance with the first instruction, and (iii) if a second instruction to update information in the queue table is issued, update the queue table in the volatile memory and the queue table in the nonvolatile memory in accordance with the second instruction.

* * * * *

UNITED STATES PATENT AND TRADEMARK OFFICE
CERTIFICATE OF CORRECTION

PATENT NO. : 7,403,831 B2
APPLICATION NO. : 11/442936
DATED : July 22, 2008
INVENTOR(S) : Satoshi Sugiura It is certified that error appears in the above-identified patent and that said Letters Patent is hereby corrected as shown below:

Column 7, line 8, delete "issuer" and insert -- issue --

Signed and Sealed this

Seventh Day of October, 2008

JON W. DUDAS
*Director of the United States Patent and Trademark Office*